Patented June 16, 1925.

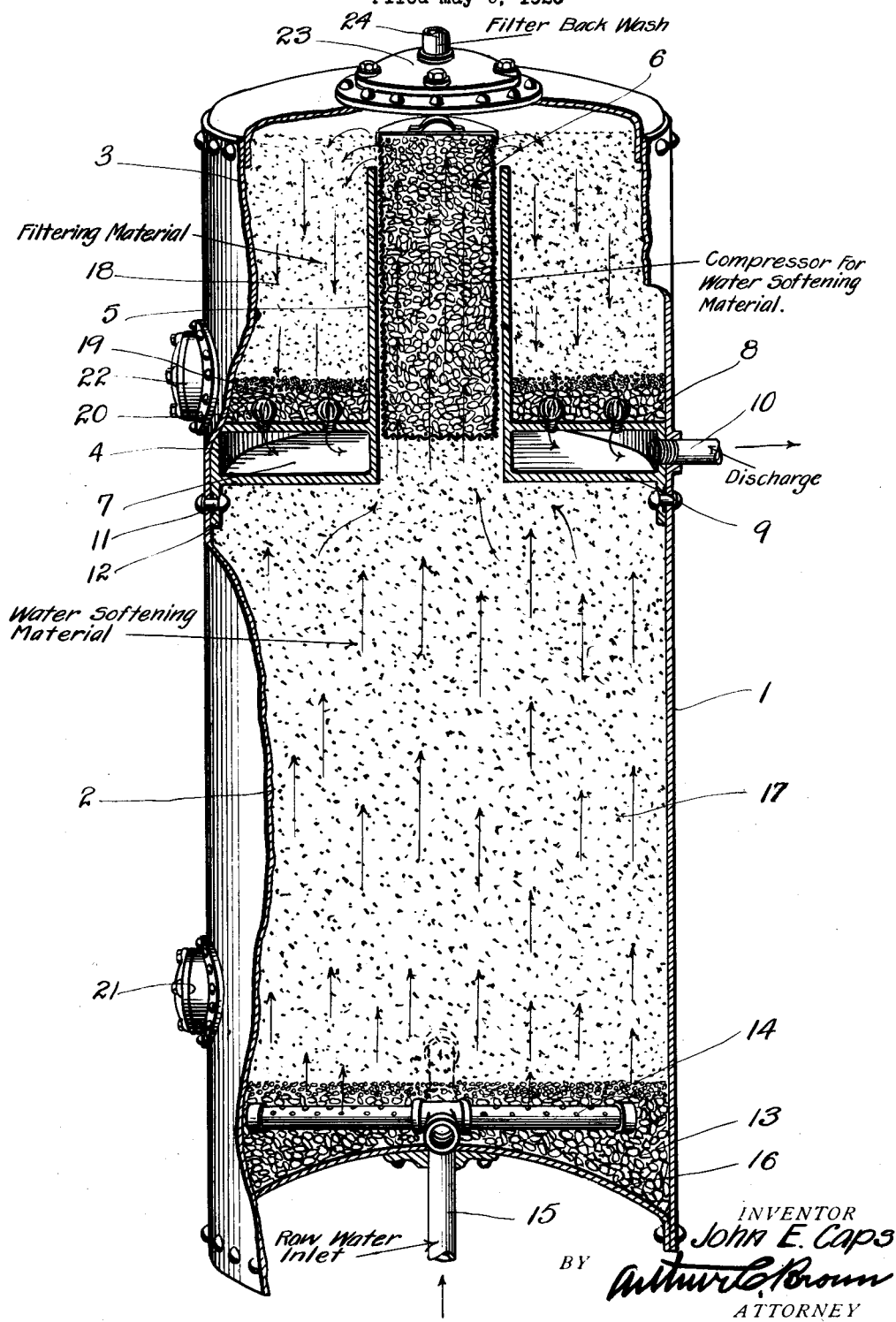

1,541,921

UNITED STATES PATENT OFFICE.

JOHN E. CAPS, OF WILMETTE, ILLINOIS.

WATER SOFTENER AND FILTER.

Application filed May 5, 1923. Serial No. 636,861.

*To all whom it may concern:*

Be it known that I, JOHN E. CAPS, a citizen of the United States, residing at Wilmette, in the county of Cook and State of Illinois, have invented certain new and useful Improvements in Water Softeners and Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a water softening and filtering device, the primary object being to provide a simple, efficient means for softening hard water and for filtering out extraneous matter.

The invention contemplates a casing in the lower portion of which is a water softening bed through which the water passes in ascending stream lines, and from which it overflows into a filter bed in descending stream lines, there being means provided for preventing cavitation and channeling of the water softening bed, comprising an adjustable packer which will maintain the water softening material bed in a packed condition, the packer having movement to bear continuously upon the material of the water softening bed, as the material settles, as it will do in actual operation.

The water softening bed may consist of any appropriate material, but I recommend a natural material, known as glauconite, also designated as green sand or green marl, in which the iron content has been fixed, for example, by adding minute quantities of aluminum salts. It may be illuminative to state here that glauconite or green sand has the property of efficiently softening hard water, but ordinarily it has the disadvantage of coloring the water. If, however, the iron content of the glauconite is fixed, for example, by adding the minute quantities of aluminum salts, as above mentioned, the softening properties of glauconite will not be impaired but the turpidity occasioned by passing the water through the raw green sand will be eliminiated so that the water will be clear.

After a period of use, however, the treated green sand or glauconite will lose its efficiency as a water softener due to the fact that it has taken up extensive amounts of alkali, such as lime and magnesia. It can be restored to the original condition by adding sodium chloride to neutralize the alkali, whereupon the glauconite or green sand will be regenerated and its water softening properties restored.

The aluminum salts may be added to the glauconite or green sand before it enters the casing or the aluminum salts may be added in solution to the glauconite or green sand after the water softening bed is in place.

In this application, I do not make any special claim to the preparation or the treatment of the glauconite; I merely recommend its use as a reasonably priced material especially adapted for use in connection with my invention.

The novel construction of the invention will be apparent by reference to the following description in connection with the accompanying drawings in which:

The figure is a vertical, longitudinal section through a combined water softener and filter, constructed in accordance with my invention.

Referring now to the drawings by numerals of reference 1, designates an elongated vertical cylinder, divided intermediate its ends into a water softening chamber 2 and a water filtering chamber 3, the division being made by a hollow casting 4 having an upstanding constricted neck or tube which establishes communication between the chambers 2 and 3 and which also serves as guide for a packer or compressor cage 6 adapted to contain gravel or relatively coarse material which will not hinder the passage of the water through the tubular passage way or neck 5. The hollow casing is provided with a filtering water chamber 7 formed by the two spaced parallel walls 8 and 9, the chamber having an outlet communicating with a discharge pipe 10, passing through the casing 1, the casing being held in place by fastening devices, such as rivets 11, which pass through the casing and through the flange 12, depending from the periphery of the main portion of the casting.

The chamber 2 may be provided at its bottom with relatively coarse filtering material 13 in which is embedded the radial pipes 14 and a raw water inlet pipe 15, shown as passing through the bottom 16 of the cylinder.

Upon the material 13 is placed the water softening material 17 which constitutes a relatively deep bed and, as above explained, I prefer to employ glauconite or green sand, treated in the manner above referred to. The raw water from the pipe 15 passes through the bed 13 and through the water softening bed 17, discharging through the neck or tubular passage way 5, and overflowing the edge thereof into the filter chamber 3, which contains a bed of filtering material 18, preferably supported upon coarser material 19 resting upon the wall or floor 8. The wall or floor 8 is provided with openings 20 so that the water can pass into the chamber 7 and discharge through the pipe 10.

Unless a compressor or packer was provided for the material in the water softening chamber 2, the passage of the water in ascending stream lines would tend to cavitate or channel the bed formed by the material 17. In order to eliminate the liability of the cavitating or channeling, I provided a compressor or packer 6 which will bear upon the upper surface of the water softening bed with sufficient weight to hold it in a packed condition so that the water can not cavitate or channel it. Of course, in use the material 17 will have a tendency to settle, but since the compressor or packer 6 is loose in the tubular member 5, it is obvious that it will gravitate as the material 17 settles and thereby continuously exert a pressure upon it, thus retaining it so that it will not be carried away by the water passing through it.

For convenience, I have provided hand holes, closed by the covers 21 and 22 so that access can be had to the water softening chamber and the filter chamber, and at the top of the casing, I have shown cover 23, to which a filter backwash pipe 24 is connected. The filter backwash pipe communicates with filter chamber 3 so that when it is desired to clean the filter bed, the flow may be reserved by drawing the water into the pipe 10, passing it in ascending stream lines through the filter bed into pipe 4 to carry away impurities. In order to cleanse the softening bed as well as the filter bed, the water may be passed through pipe 10 up through the filter bed, thence down through the softening material bed, and up through pipe 15. Therefore, the softening bed and the filter bed may both be cleansed of impurities.

What I claim and desire to secure by Letters Patent is:

1. In a device of the class described, a casing having an inlet at the bottom and an outlet intermediate its ends, a hollow casting co-extensive in cross section with the casing, and having a hollow portion communicating with the outlet, one wall of the casting having openings whereby communication may be established between the casing and the hollow portion of the casting, the casting having a central upstanding tubular neck, terminating short of the top of the casing, and a packer loosely mounted in the tubular neck, adapted to bear upon material in the lower chamber.

2. In a device of the class described, a casing having an inlet at its bottom and an outlet intermediate its ends, a hollow casting co-extensive in cross section with the casing communicating with the outlet, openings in the casting for establishing communication between the hollow portion of the casting and the casing, the casting having a central opening and a packer in the opening adapted to bear upon the material in the casing.

3. In a device of the class described, a casing having an inlet at its bottom and an outlet intermediate its ends, a member dividing the casing into an upper chamber and a lower chamber, the upper chamber communicating with the outlet and a gravitating packer above the lower chamber having free sliding movement through an opening in the member to bear upon material in the lower chamber.

4. In a device of the class described, a casing having an inlet at its bottom and an outlet intermediate its ends, a hollow perforate casting co-extensive in cross section with the casing dividing the casing into an upper chamber and a lower chamber, the hollow portion of the casting communicating with the outlet, a neck carried by the casting and a gravitating weighted packer slidable in the neck.

5. In a device of the class described, a casing having an inlet at its bottom and an outlet intermediate its ends, a hollow perforate casting between the ends of the casing to divide it into an upper chamber and a lower chamber, the hollow portion of the casting communicating with the outlet and the perforations communicating with the upper chamber, an elongated neck surrounding an opening in the casting whereby communication may be had between the upper chamber and the lower chamber and a packer loosely mounted in the neck adapted to bear upon material in the lower chamber.

In testimony whereof I affix my signature.

JOHN E. CAPS.